Jan. 12, 1926.  1,569,600
C. H. ALLBRIGHT
COMBINATION CAMP TABLE, LUGGAGE CARRIER, AND CHILD'S BED
Filed May 29, 1924   2 Sheets-Sheet 1

Witness:
W. Hall.

Inventor
Charles H. Allbright
By Hazard and Miller
Attorneys.

Jan. 12, 1926.  
C. H. ALLBRIGHT  
1,569,600  
COMBINATION CAMP TABLE, LUGGAGE CARRIER, AND CHILD'S BED  
Filed May 29, 1924  2 Sheets-Sheet 2
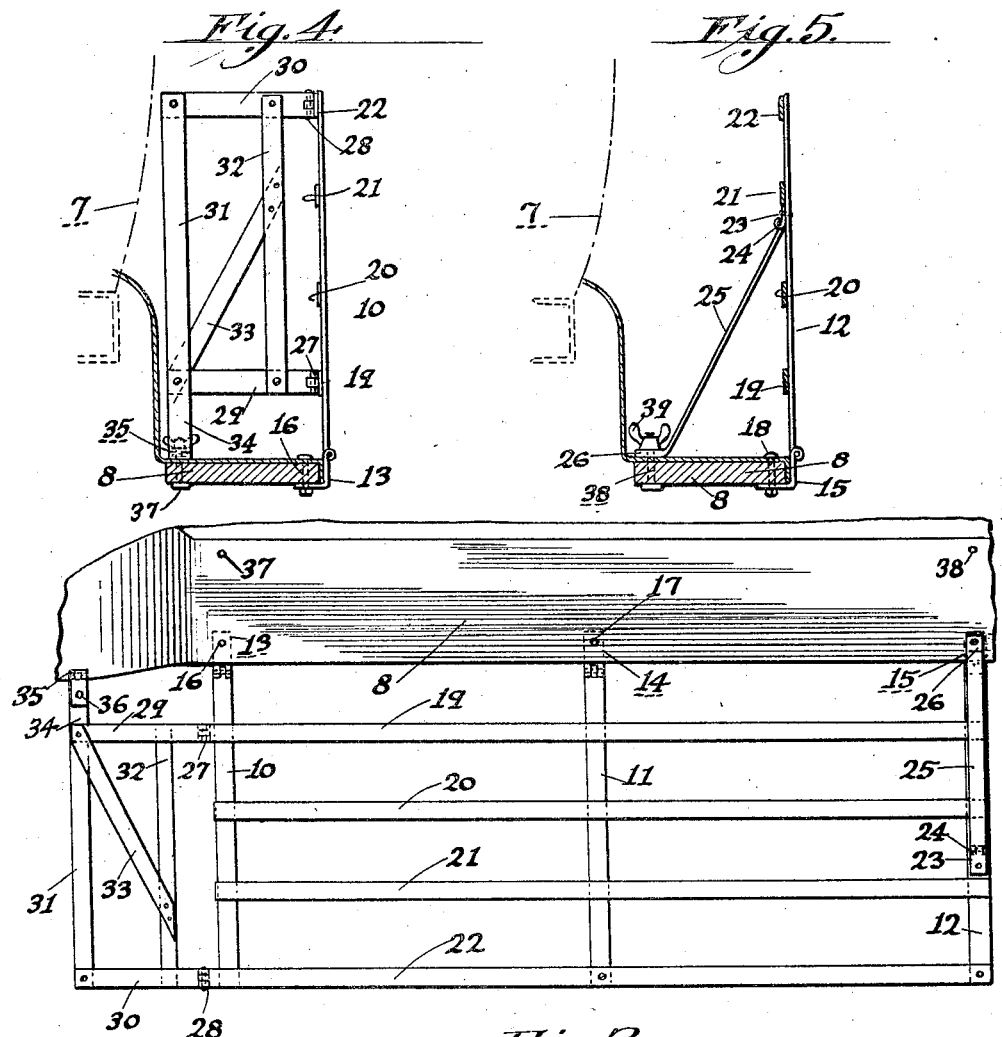
Inventor:
Charles H. Allbright
By Hazard and Miller
Attorneys
Witness:
Wm. Hall.

Patented Jan. 12, 1926.

1,569,600

UNITED STATES PATENT OFFICE.

CHARLES H. ALLBRIGHT, OF SANTA MARGARITA, CALIFORNIA, ASSIGNOR OF ONE-HALF TO PAUL A. BARLOW, OF SANTA MARGARITA, CALIFORNIA.

COMBINATION CAMP TABLE, LUGGAGE CARRIER, AND CHILD'S BED.

Application filed May 29, 1924. Serial No. 716,769.

*To all whom it may concern:*

Be it known that I, CHARLES H. ALLBRIGHT, a citizen of the United States, residing at Santa Margarita, in the county of San Luis Obispo and State of California, have invented new and useful Improvements in Combination Camp Tables, Luggage Carriers, and Children's Beds, of which the following is a specification.

This invention relates to a combination table, luggage carrier and child's bed, and it has for one of its objects the provision of a device, capable of performing the three above named functions, when attached to an automobile.

Another object of this invention is the provision of a combined table, luggage holder and child's bed, which may be readily converted from one form to another.

It is an object of this invention to provide a structure comprising a main frame hingedly secured to the running board of an automobile with means to secure the same in a vertical position when the device is to be used as a package holder. At one end of the main frame is an auxiliary frame hinged to the main frame, which, when the main frame is in vertical position, is made to assume a position at right angles to the main frame and is likewise secured to the running board. When the main frame is in a horizontal position the auxiliary frame rests upon the fender of the automobile at a slight inclination from the plane of the main frame upon which the pillow is to be placed when the structure is to be used as a child's bed.

Figure 1:
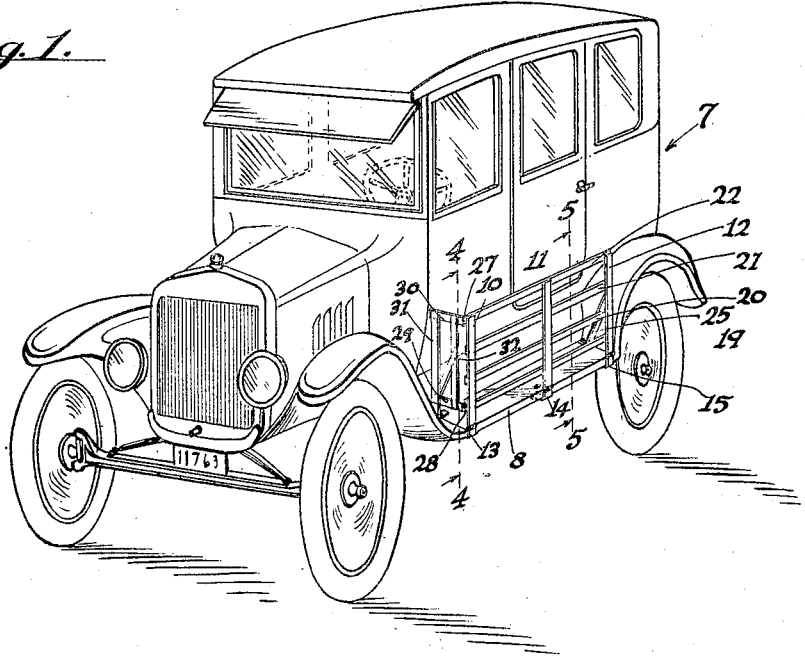
Figure 2:
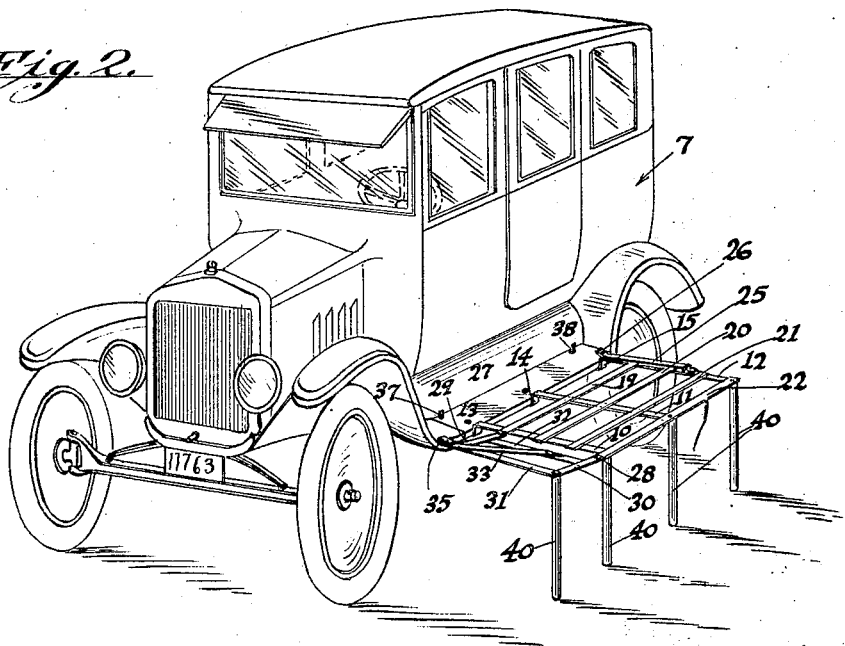

With the foregoing objects in view, together with such other objects and advantages as may subsequently appear, this invention consists in the construction and arrangement of parts hereinafter described and claimed and illustrated in the accompanying drawings, in which:

Figure 1 is a perspective view of an automobile showing my improved device attached to the running board to serve as a luggage holder, Fig. 2 is a view similar to Fig. 1, but shows the device of my invention converted to serve as a camp table or a child's bed, Fig. 3 is a plan view of my device in position for serving as a child's bed or table, the view showing the device secured to the running board of an automobile, Fig. 4 is a section taken on the line 4—4 of Fig. 1, and Fig. 5 is a section taken on the line 5—5 of Fig. 1.

Referring to the drawings for a more detailed description thereof, the numeral 7 indicates an automobile having a running board 8 to which the device of my invention is attached. The device comprises parallel iron bars 10, 11 and 12, hingedly connected to short L-shaped members 13, 14 and 15 respectively which are secured by means of bolts 16, 17 and 18 respectively to the under face of the running board 8. The device also comprises parallel bars 19, 20, 21 and 22 riveted to the bars 10, 11 and 12 and positioned at right angles thereto. To the bar or member 12 is secured a member 23 to which is hinged at 24 a bracing member 25, the free end portion 26 of which is bent so that it will be parallel with the running board when the device is used as a luggage holder.

The forward end of the bars 19 and 22 extend forward of the bar 10 forming extensions 27 and 28 respectively. To the extensions 27 and 28 are hinged parallel bars 29 and 30 respectively, to which are riveted at right angles thereto parallel bars 31 and 32. A diagonal brace 33 is secured to the members 29 and 32. The member 31 extends beyond the member 29 towards the automobile forming an extension 34 to which is hinged a member 35 having an aperture 36 adapted to receive a bolt 37 passing upwardly through the running board when the device is used as a luggage carrier, as shown in Fig. 1.

The hinged member 35 is adapted to be turned down and to lie on the projection 34 of the member 31 when the device is used either as table or as a child's bed, as illustrated in Fig. 2.

In using the device as a luggage holder, the same is held in position by the member 35 being bolted to the running board and the brace 25 also being bolted to the running board by a threaded bolt 38 passing through the running board and through the portion 26 of the brace and being engaged by a wing nut 39.

When the device is used as a table or as a bed, the hinged end portion of the device forms an extension of the major portion of the device and when the latter is employed as a luggage holder, the hinged end section forms an end of the holder.

It will be understood that when the device is to be converted from a luggage holder to a bed or a table, the wing nut 39 is removed from the bolt 38 and the brace 25 moves into contact with the bars 19 and 20 and the end of the brace rests on the upper face of the running board.

Fig. 2 shows the device supported by four legs 40, one of the legs being positioned at the outer forward corner of the hinged extension and the other three supporting the major portion of the device. The legs 40 may be secured to the device by having pins set in their upper ends which engage apertures in the device.

Thus I have produced a combined luggage holder, table and bed comprising a main section hingedly secured to the running board of an automobile, an end section hingedly secured to said main section, a hinged brace secured to said main section, a hinged brace secured to said end section, and detachable legs for supporting said sections.

This invention has been described, but modifications thereof may be devised without departing from the spirit thereof, and it is to be understood that such modifications come within the scope of this invention.

What is claimed is:

1. A combined luggage holder, table and bed adapted to be hingedly secured to the running board of an automobile, comprising a main frame, including bars arranged at right angles to each other, a brace provided with a hinge and having one end permanently attached to the upper face of said main frame and the other end detachably secured to the running board when the said main frame is in vertical position and an auxiliary frame hingedly secured to said main frame and adapted to fold at right angles to said main frame, and an extension on said auxiliary frame having a hinge adapted to be detachably secured to said running board.

2. A combined luggage holder, table and bed adapted to be hingedly secured to the running board of an automobile, comprising a main frame, a brace provided with a hinge and having one end permanently attached to the upper face of said main frame and the other end detachably secured to the running board when the said main frame is in vertical position and an auxiliary frame hingedly secured to said main frame and adapted to fold at right angles to said main frame, and an extension on said auxiliary frame having a hinge adapted to be detachably secured to said running board.

In testimony whereof I have signed my name to this specification.

CHAS. H. ALLBRIGHT.